United States Patent
Udechukwu et al.

(10) Patent No.: US 12,482,544 B2
(45) Date of Patent: Nov. 25, 2025

(54) MACHINE LEARNING SYSTEM FOR IRREVOCABLE PATIENT OUT-OF-POCKET COSTS FOR PRESCRIPTIONS

(71) Applicant: WALGREEN CO., Deerfield, IL (US)

(72) Inventors: Ajumobi O. Udechukwu, Lake Forest, IL (US); Yannik K. Pitcan, Berkeley, CA (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 18/604,471

(22) Filed: Mar. 13, 2024

(65) Prior Publication Data

US 2024/0221888 A1    Jul. 4, 2024

Related U.S. Application Data

(63) Continuation of application No. 17/182,361, filed on Feb. 23, 2021.

(51) Int. Cl.
*G16H 20/10* (2018.01)
*G06N 20/00* (2019.01)
*G06Q 20/08* (2012.01)

(52) U.S. Cl.
CPC ............. *G16H 20/10* (2018.01); *G06N 20/00* (2019.01); *G06Q 20/0855* (2013.01)

(58) Field of Classification Search
CPC .................................................... G16H 20/10
See application file for complete search history.

(56) References Cited

U.S. PATENT DOCUMENTS

| 2017/0255759 A1* | 9/2017 | McGrath | G16H 20/10 |
| 2021/0135841 A1* | 5/2021 | Lee | G06F 21/6245 |
| 2022/0176118 A1* | 6/2022 | John | A61N 2/006 |

OTHER PUBLICATIONS

U.S. Appl. No. 16/521,290, Methods and Apparatus to Estimate Costs of Prescriptions, filed Jul. 24, 2019.

* cited by examiner

*Primary Examiner* — Reginald R Reyes
(74) *Attorney, Agent, or Firm* — MARSHALL, GERSTEIN & BORUN LLP; Randall G. Rueth

(57) ABSTRACT

Techniques for generating an irrevocable or guaranteed out-of-pocket (OOP) cost for a patient's prescription prior to the patient submitting the prescription for processing and filling by an enterprise include receiving a request for the OOP cost, obtaining current information corresponding to the patient, and determining the irrevocable OOP cost of the prescription based on the current patient information, one or more constraints set by the enterprise for a given time interval and associated with OOP prescription costs, and changes to characteristic(s) of the patient and/or occurrences of external condition(s) predicted to occur during the given time interval. The irrevocable OOP cost may be charged to the patient for the prescription irrespective of any amount which is provided by the patient's insurance provider to cover the cost of the prescription. The techniques may utilize a set of specially-trained irrevocable OOP cost machine learning models to determine the irrevocable OOP prescription cost.

25 Claims, 5 Drawing Sheets

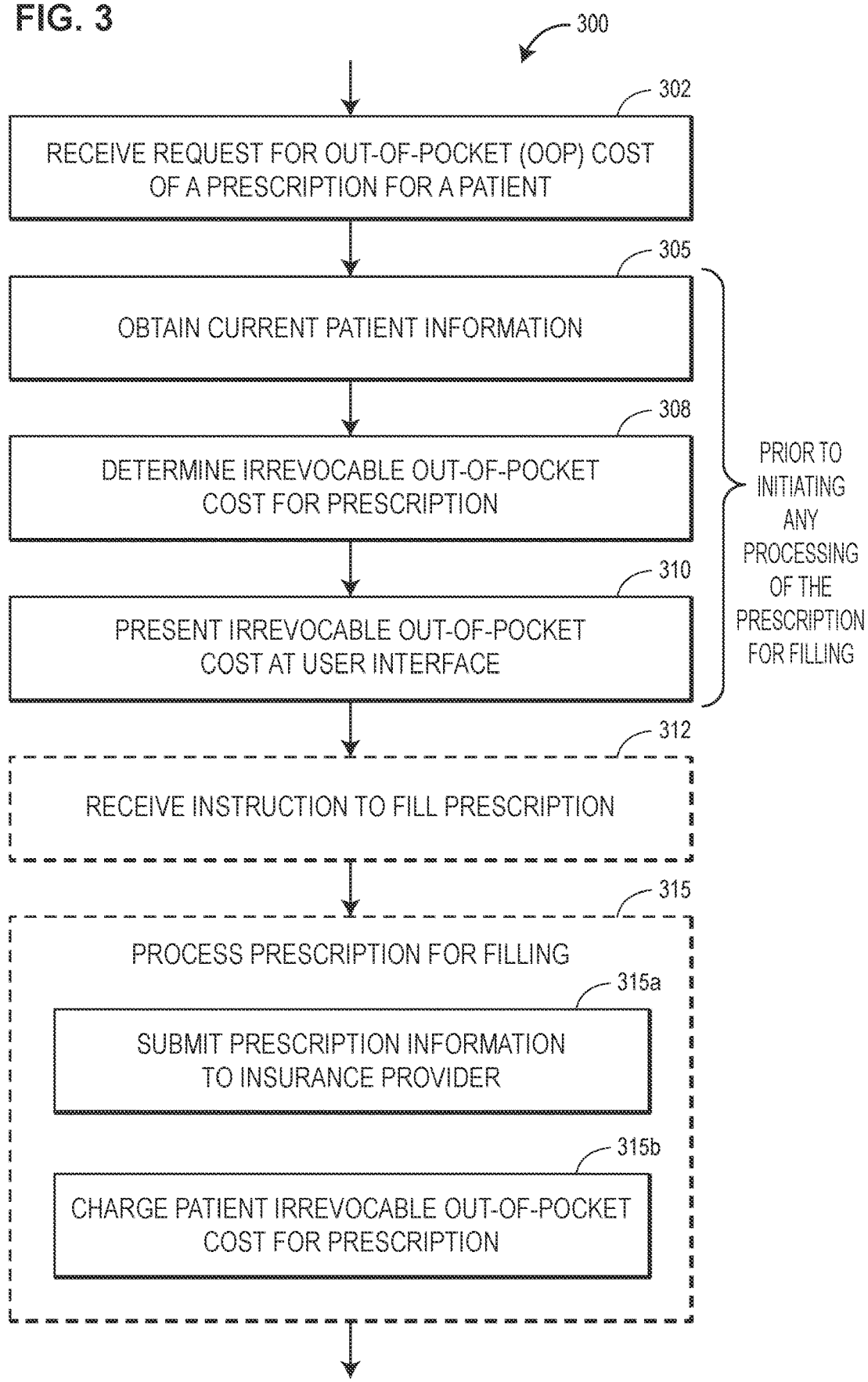

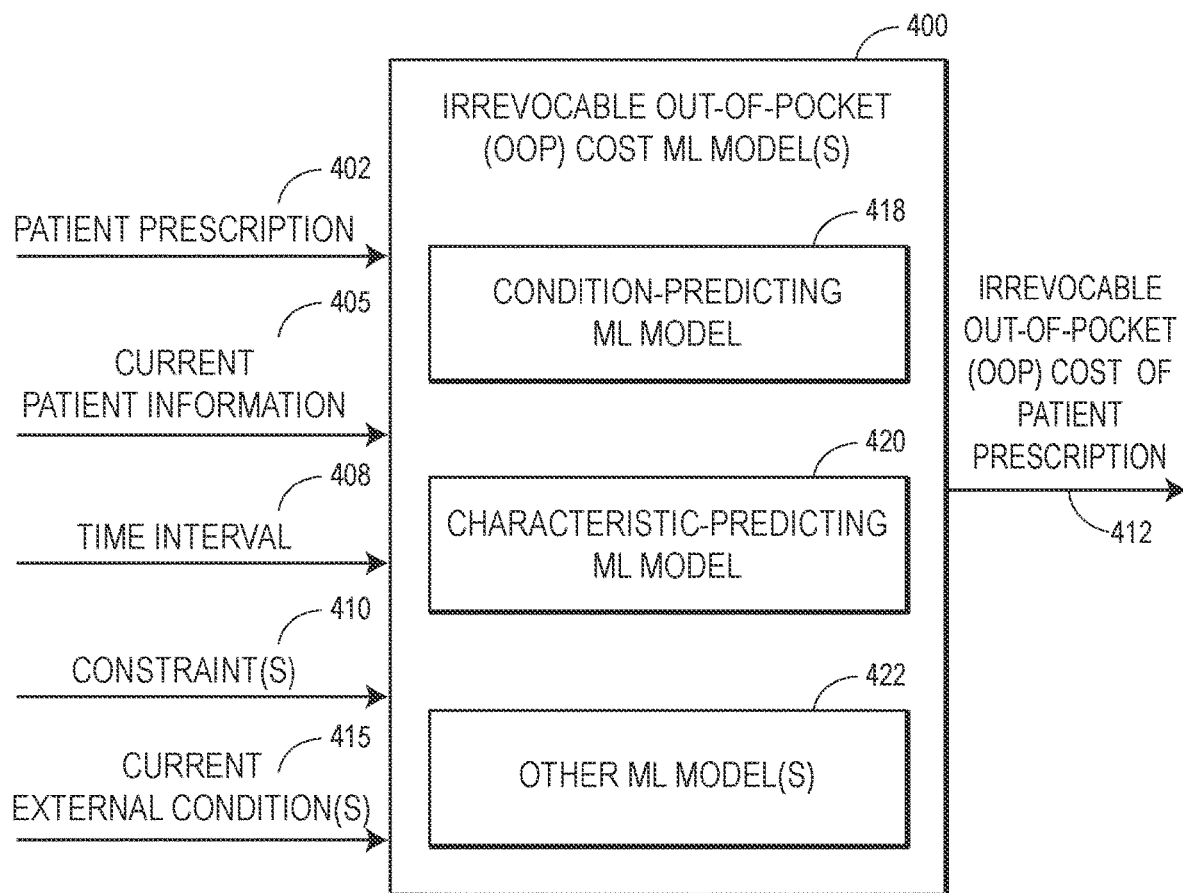

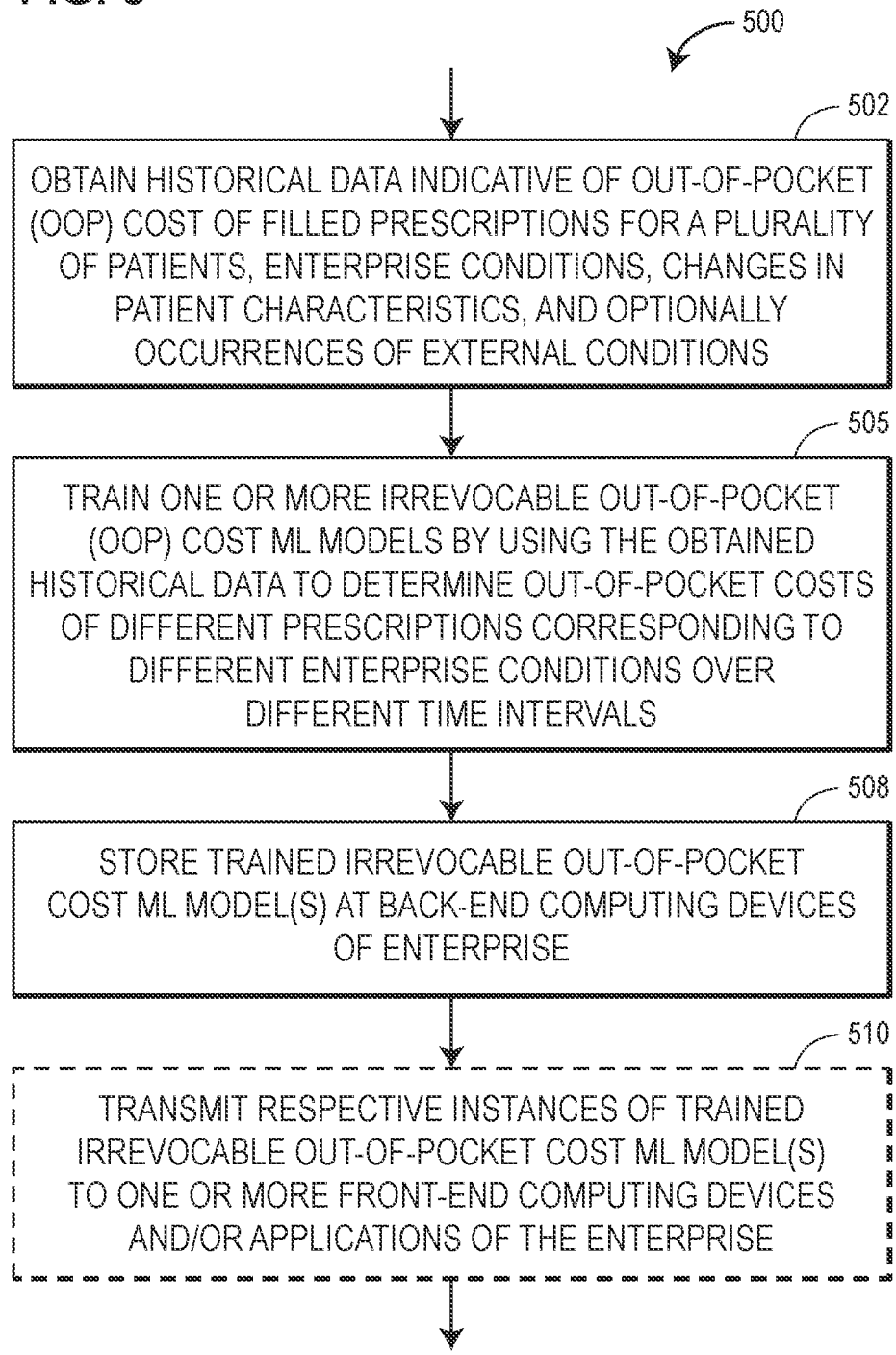

MACHINE LEARNING SYSTEM FOR IRREVOCABLE PATIENT OUT-OF-POCKET COSTS FOR PRESCRIPTIONS

CROSS-REFERENCE TO RELATED APPLICATIONS

This application is a continuation of U.S. patent application Ser. No. 17/182,361 entitled "MACHINE LEARNING SYSTEM FOR IRREVOCABLE PATIENT OUT-OF-POCKET COSTS FOR PRESCRIPTIONS" and filed on Feb. 23, 2021, the disclosure of which is hereby incorporated by reference herein in its entirety.

TECHNICAL FIELD

This application generally relates to a machine learning system for generating an irrevocable or guaranteed out-of-pocket cost of a prescription for a particular patient.

BACKGROUND

Prescribers (e.g., medical professionals) write prescriptions for medications for their patients. Pharmacies and other authorized enterprises process a prescription for a medication prescribed to a patient by submitting the prescription to a payor, e.g., an insurance provider, where the payor indicates how much of the price of the prescription is covered by the patient's insurance. When the filled prescription is picked up, mailed, etc., the patient is responsible for paying the difference between the price of the prescription and the amount covered by the payor or insurance provider, e.g., the out-of-pocket cost of the filled prescription.

Patient out-of-pocket costs for prescription medications are difficult to estimate with accuracy, as a patient's insurance terms (e.g., deductible amounts, authorized refills, etc.) may change between the time a patient requests an estimate of the out-of-pocket costs of a prescription and the time the prescription is filled and picked up. Further, from year to year, the types, levels, and terms of insurance covering various prescription medications may change, thus making it difficult for the pharmacy or enterprise to accurately forecast the effect of prescription medication out-of-pocket costs on enterprise profits and losses.

SUMMARY

In an embodiment, a method may include receiving, at a computing system of an enterprise, a request for an out-of-pocket cost of a prescription for a medication prescribed for a patient; and based on the request, obtaining current information corresponding to the patient. Additionally, the method may include, prior to initiating processing the prescription for filling, determining, by the computing system, an irrevocable out-of-pocket cost of the prescription. The determining may be based on the current information corresponding to the patient, one or more constraints set by the enterprise for a given time interval, changes to one or more characteristics of the patient predicted to occur prior to the end of the given time interval, and one or more external conditions predicted to occur prior to the end of the given time interval. The one or more external conditions may be conditions that affect out-of-pocket prescription costs, and the one or more external conditions may be initiated by one or more parties external to the enterprise, the one or more parties excluding the patient. The determined, irrevocable out-of-pocket cost of the prescription may have a value in accordance with the one or more constraints set by the enterprise for the given time interval. The method may further include, prior to initiating processing the prescription for filing and in response to the request, presenting, by the computing system, the irrevocable out-of-pocket cost of the prescription at one or more of: a user interface of the computing system or a user interface of a computing device corresponding to the patient.

In an embodiment, a system of an enterprise may include one or more data storage devices storing a set of irrevocable out-of-pocket (OOP) cost ML models trained on historical data to determine out-of-pocket costs of prescriptions for different sets of enterprise constraints over different time intervals. The system may also include one or more communication interfaces via which the system receives a request for an out-of-pocket cost of a prescription for a medication prescribed for a patient; and an irrevocable out-of-pocket cost generation component stored on the one or more data storage devices. The irrevocable out-of-pocket cost generation may be configured to apply the set of irrevocable out-of-pocket cost ML models to indications of the prescription prescribed for the patient, current information corresponding to the patient, and one or more constraints set by the enterprise for a given time interval to determine an irrevocable out-of-pocket cost of the prescription for the patient, where the irrevocable out-of-pocket cost has a value in accordance with the one or more constraints. The irrevocable out-of-pocket cost of the prescription may be a guaranteed out-of-pocket cost of the prescription determined prior to initiating processing of the prescription for filling.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 3 depicts a flow chart of an example method for generating an irrevocable out-of-pocket cost for a prescription of a medication which has been prescribed for a patient.

FIG. 4 depicts a block diagram of an example implementation of a set of irrevocable out-of-pocket cost machine-learning models, which may be utilized in the system of FIG. 1 and/or in the device of FIG. 2.

FIG. 5 illustrates a flow chart of an example method for creating or generating one or more irrevocable out-of-pocket cost machine-learning models, such as the ML models depicted in FIGS. 1, 2, and 4.

DETAILED DESCRIPTION

Figure 1:
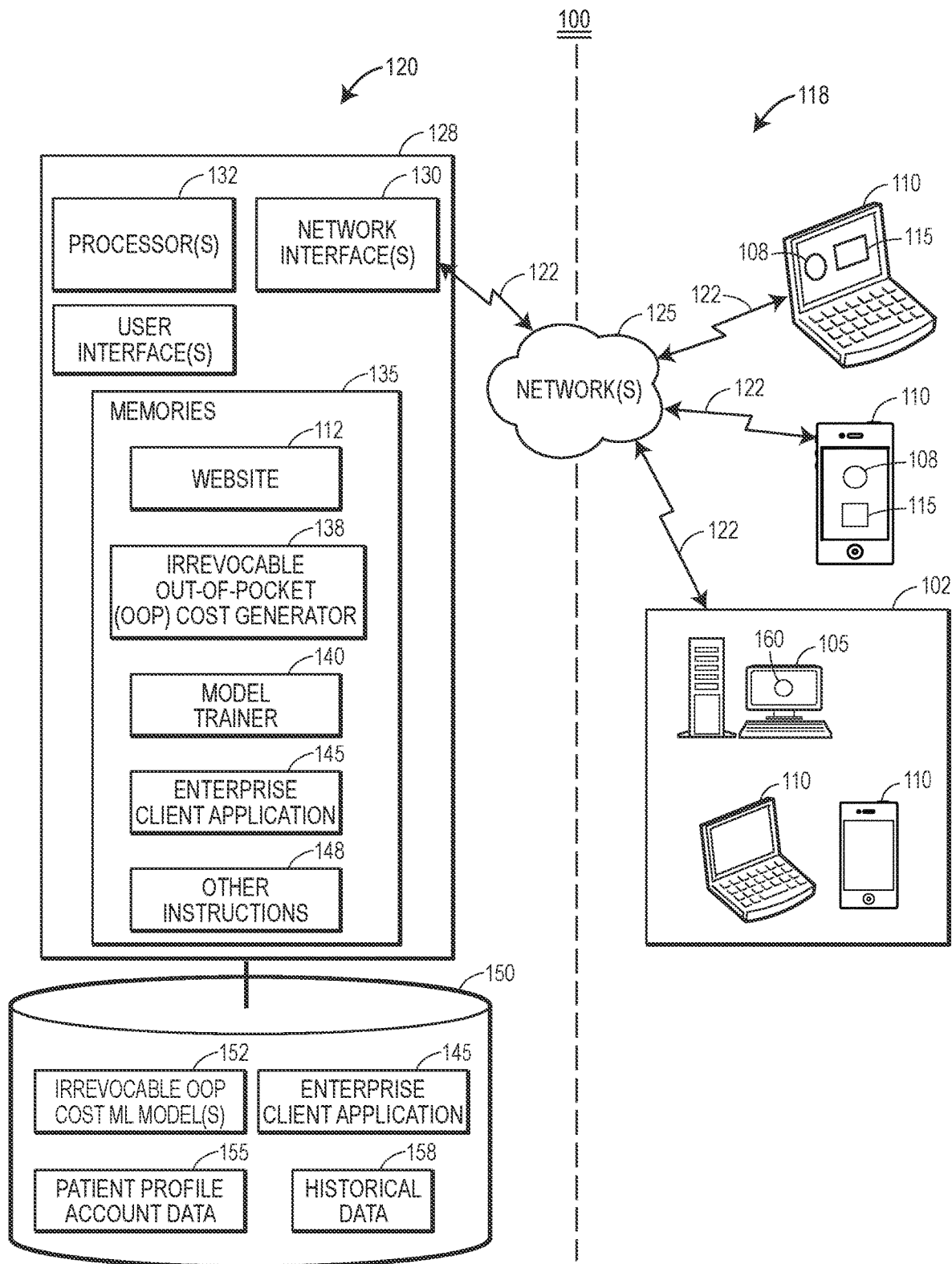
FIG. 1 depicts a block diagram of an example system of an enterprise for generating an irrevocable out-of-pocket cost of a prescription for a medication prescribed for a patient, e.g., prior to processing the prescription for filling.

FIG. 1 illustrates a block diagram of an example system 100 for generating an irrevocable out-of-pocket (OOP) cost of a prescription for a medication prescribed for a patient. The system 100 may be a machine learning (ML) system, for example. The prescription may include, for example, patient information (e.g., name, age, date of birth, etc.), prescriber information (e.g., prescribing clinician's name, address, contact information, etc.), medication information (name of medication being prescribed, its dose, its dosage form, etc.), instructions on how to take the medication (e.g., how much medication to take, how to take the medication, how often to take the medication, etc.), dispensing instructions (e.g., total amount of medication to be dispensed and the form of the dispensed medication), number of refills, prescriber signature and identifier number, and the like.

As utilized herein, the "out-of-pocket" cost or "OOP" cost of a prescription generally refers to the monetary amount which the patient is responsible for paying for the filled prescription (e.g., upon pick-up or mailing of the filled prescription), which typically is the difference between the price of the prescription charged by the enterprise and a monetary amount (if any) which is provided by an insurance provider or payor towards the prescription, e.g., a "covered" amount of the prescription price. An "irrevocable" out-of-pocket cost of a prescription, as utilized herein, generally refers to an OOP cost which is a guaranteed OOP cost for the patient. That is, the amount of the irrevocable OOP cost of a prescription which is provided upon patient request prior to the patient submitting the prescription for filling is the same amount which the patient is charged and responsible for paying when the patient (or the patient's agent or representative) picks up or is mailed the filled prescription, irrespective of any reimbursement or contribution by the patient's insurance provider. Further, for ease of reading and not for limitation purposes, the term "patient" is utilized herein generally to refer to the patient for whom the prescription was written and/or, in some situations, the patient's agent or representative who may be, for example, a parent, a spouse, an adult child of the patient, a home health care giver of the patient, and/or any other party who is authorized by the patient to manage prescriptions on the patient's behalf with the enterprise.

The system 100 may include a combination of hardware, firmware, and software components, as well as various data communication channels for communicating data between and among the various hardware, firmware, and software components. The machine learning system 100 may be owned and/or operated by an enterprise or organization, such as a pharmacy or other type of provider which is authorized to fill prescription medications. Generally, but not necessarily, the enterprise may include one or more physical storefronts or physical storefront locations 102 at which one or more local or front-end computing devices 105 are disposed. Examples of physical storefronts of the enterprise may include bricks-and-mortar stores, pharmacy operations hosted within other buildings (such as hospitals, university buildings, other retailer locations, airports, etc.), and the like, each of which may have a respective mailing (e.g., postal) address. Additionally or alternatively, the enterprise may include one or more electronic storefronts or electronic storefront locations, such as instances 108 of client applications provided by the enterprise to execute at various user person electronic devices (PEDs) 110, and/or a website 112 that is accessible to the user electronic devices 110, e.g., via one or more web browsers 115, each of which may have one or more respective electronic addresses (such as website address, IP address, etc.). For example, a user of a PED 110 may access and navigate the enterprise website 112 via a browser 115 executing at the PED 110, and/or via an instance 108 of an enterprise-provided client application 145 which has been downloaded to and is executing on the PED 110.

The personal electronic device or PED 110 operated by the user (e.g., by the patient or by an agent or representative of the patient) may be, for example, a personal computer, a cellular phone, a smart device, a mobile communications device, a tablet, a laptop, another type of handheld electronic device, a desktop computer, etc. For ease of discussion, the PED 110 is referred to interchangeably herein as a "mobile device 110" or a "client device 110," however, the techniques are equally applicable to any type of PED 110 operated by a user irrespective of whether or not the PED 110 is mobile or stationary. It is noted that, in some implementations, an enterprise may choose to apply the systems, methods, and techniques described herein to only certain types of PEDs 110 (e.g., to only mobile devices and not stationary devices; only to only smart devices and smart phones but not tablets or laptops, etc.). However, these types of implementations are at the discretion of the enterprise as, generally speaking, the systems, methods, and techniques disclosed herein are equally applicable to any type of PED 110.

The local computing devices 105 of the system 100, the website 112 accessed via browsers 115 at the PEDs 110, and the instances 108 of enterprise client applications executing at PEDs 110 are collectively referred to herein as "front-end components 118" of the ML system 100. The ML system 100 may also include a set of back-end components 120. Communicative connections or links 122 between the front-end components 118 and the back-end components 120 may be established through one or more digital data and/or communications networks 125. The digital network(s) 125 may include a proprietary network, a secure public Internet, a virtual private network, and/or some other type of network, such as dedicated access lines, plain ordinary telephone lines, satellite links, wireless links, wired links, combinations of these, etc. Where the digital network 125 comprises the Internet or other IP-based communication network, data communication may take place over the digital network 125 via a protocol of the Internet protocol suite (e.g., TCP/IP, UDP, SCTP, various application layer protocols, etc.). Generally speaking, the communicative connections or links 122 which are established between the front-end components 118 and the back-end components 120 may be implemented by using any known communication technique, such as by establishing sessions therebetween, tunneling, circuit-switching, virtual circuit switching, etc.

The back-end components 120 may include one or more servers or computing devices 128, which are interchangeably referred to herein as "the back-end servers 128," "the back-end computing devices 128," or the "back-end server system 128." The one or more back-end computing devices 128 may be implemented, for example, by a bank of servers, a cloud computing system, one or more networked computing devices, or any other suitable arrangement of one or more computing devices. The back-end computing devices 128 may include one or more network interfaces 130 that communicatively connect the back-end computing devices 128 to the network(s) 125, the local computing devices 105 of the physical storefronts 102, and the PEDs 110, as well as to other computing systems. Additionally, the back-end computing devices 128 may include one or more processors 132, one or more user interfaces 133, and one or more tangible, non-transitory memories 135 on which the website 112 and the other programs, applications, instructions, and/or routines 138-148 pertaining to the enterprise are stored. For example, the one or more memories 135 may store an irrevocable out-of-pocket cost generating module or component 138, a model training module or component 140, and/or other modules, components, programs, applications, etc. 145, 148, each of which comprises respective computer-executable instructions that are executable by the one or more processors 132. For example, at least one device of the back-end computing devices 128 may store instructions 148 for hosting the website 112 of the enterprise. In some embodiments, the one or more memories 135 may store an enterprise client application 145, instances 108 of which may be downloaded into user PEDs 110 for execution thereon. In some embodiments, instances 160 of the irrevocable OOP cost generator 138 stored in the one or more memories 135 may be downloaded into one or more enterprise front-end computing devices 105 for execution thereon.

Additionally, the back-end computing devices 128 may include and/or may be communicatively connected to one or more data stores 150, where the one or more data stores 150 comprise one or more tangible, non-transitory data storage devices which are particularly adapted to store data related to the operations of the ML system 100. It should be appreciated that although the data stores 150 are shown in FIG. 1 as a single data storage entity, the data stores 150 may be implemented using one or more databases and/or one or more data storage devices. For example, the data stores 150 may be implemented by a data bank or a data cloud. It should be noted that, while not shown, additional databases and/or data stores may be linked to the one or more back-end servers 128 in a known manner.

The data stores 150 may store a set of one or more irrevocable out-of-pocket (OOP) cost machine learning models 152, which may be utilized by the system 100 to generate irrevocable OOP costs for prescriptions, such as is described in more detail elsewhere within this disclosure. In some implementations, the data stores 150 may store the enterprise client application 145, of which instances 108 may be downloaded into various user PEDs 110 for execution thereon.

Further, the data stores 150 may store patient profile or account data 155. The patient profile or account data 150 may include a plurality of profiles of a plurality of patients associated with the enterprise. Each patient profile may be associated with a particular individual, and may be uniquely identified within the system 100 by a respective patient identifier. For example, patient identifier may comprise a set of alphanumeric and/or other types of characters that are assigned by the enterprise to uniquely identify a particular patient to the enterprise, whether at the website or in other databases and/or locations operated by the enterprise. Each patient profile may store data corresponding to its respective patient, such as his or her login credentials (e.g., user login name, password, passphrase, passcode, answers to security questions, biometric data, etc.), contact information (e.g., address, phone numbers, email addresses, etc.), account information, patient preferences, patient demographics, other types of information descriptive of the patient, stored payment options, insurance provider information, prescription history (e.g., prescriptions that have been prescribed, ordered, filled, obtained, etc. and corresponding insurance reimbursements (if any) and out-of-pocket costs to the patient), insurance provider history, and/or other similar information indicative of transactions and/or interactions between the patient and the enterprise with regard to prescription medications, e.g., historical information regarding patient/enterprise transactions and/or interactions.

Still further, the data stores 150 may store historical data 158 related to the enterprise. In particular, the historical data 158 may include historical data indicative of various patients, the patients' interactions with the enterprise with regard to filling prescriptions and corresponding out-of-pocket costs, and occurrences of conditions which affected the out-of-pocket prescriptions costs. For example, the historical data 158 may include data indicative of, for example, out-of-pocket costs of a plurality of prescriptions that have been filled for a plurality of patients and respective times or dates of occurrences of the out-of-pocket costs; respective enterprise conditions which have occurred during different time intervals and which are based on out-of-pocket costs of prescriptions which were filled during the different time intervals (e.g., respective aggregate profit of the enterprise, respective aggregate loss of the enterprise, respective aggregate profit of the enterprise attributed to a specific patient group, respective aggregate loss of the enterprise attributed to the specific patient group, and/or other enterprise conditions which have occurred during the different time intervals, etc.); respective changes over time to a plurality of characteristics (e.g., demographic information, patient preferences, insurance coverages, types of insurance, employment, education level, life events, and/or other types of patient characteristics, such as described above) of the plurality of patients and respective times or dates of respective occurrences of the respective changes to the plurality of patient characteristics; and/or a plurality of external conditions which have occurred and respective times or dates of occurrences of the plurality of external conditions (e.g., healthcare trends, new types of insurance corresponding to prescription medications; changes to types of insurance corresponding to prescription medications; changes to levels of insurance coverage for prescription medications; respective expirations of one or more patents granted for prescription medications; executive rulings and/or directions; legislative rulings and/or directions; judicial rulings and/or directions; and the like), to name a few. The back-end computing devices or servers 128 may access the historical data 158 stored in the data stores 150 when executing various functions and tasks associated with the operation of the ML system 100.

As previously mentioned, the one or more memories 135 of the back-end servers 128 may contain or be configured with machine- or computer-readable or computer-executable instructions or modules (e.g., software) 138-148 for execution by the one or more processors 132. For example, the sets of instructions 138-148 may be implemented as programs, applications, instructions, services, modules, routines, and the like, which may be executed by the one or more processors 132 to perform various tasks associated with generating irrevocable or guaranteed OOP costs for prescriptions. In an embodiment, some of the instructions 138-148 may comprise respective sets of computer-executable instructions which, when executed by the processor 132, cause the ML system 100 to execute at least a portion of embodiments of any of the methods described herein, such as the method 300 and/or the method 500. In some implementations, one or more of the sets of instructions 138-148 may operate in conjunction with one or more front-end components 118 (e.g., in conjunction with instances 108 of the client application 145, browsers 115 via which the website 112 is accessed, one or more local computing devices 105 disposed at physical storefronts 102, etc.) to perform various tasks associated with generating irrevocable OOP costs for prescriptions and/or to perform at least portions of one or more of the methods described herein.

Still further, it will be appreciated that although only one computing device 128 is depicted in FIG. 1 as being included in the back-end components 120, multiple computing devices 128 may be provided for the purpose of distributing server load, serving different web pages, implementing different portions of an electronic web interface, servicing different enterprise client applications, etc.

Figure 2:
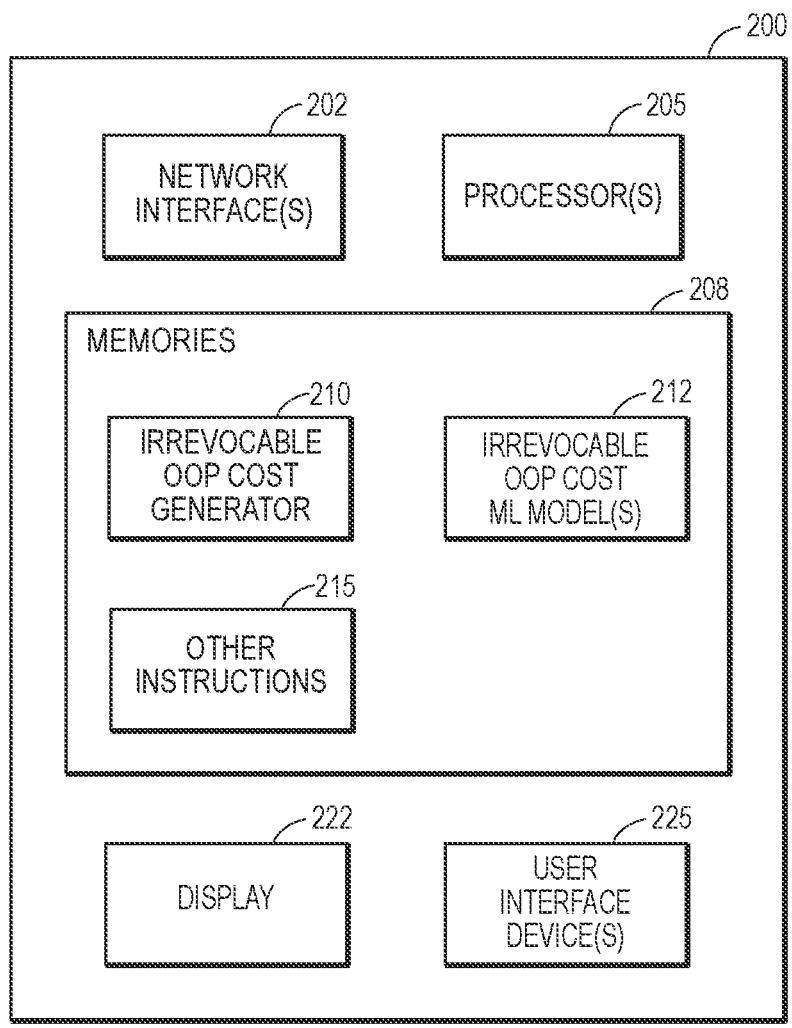
FIG. 2 depicts a block diagram of an example front-end computing device corresponding to the enterprise, which may be included in the system of FIG. 1.

FIG. 2 depicts a block diagram of an example front-end computing device 200. The front-end computing device 200 may be one of the front-end computing devices 105, 110 shown in FIG. 1, in embodiments. The front-end computing device 200 may be, for example, a desktop computing device or a portable computing device such as a tablet, laptop, smart device, or another type of handheld electronic device operated by an agent or associate of the enterprise. For instance, the computing device 200 may be a computing device 105 operated by pharmacy personnel of the enterprise. Alternately, the front-end computing device may be a personal electronic device 110 operated by the patient or by the patient's agent or representative.

As shown in FIG. 2, the front-end computing device 200 may be communicatively connected to the back-end components 120 of the enterprise via one or more network interfaces 202, e.g., via the link(s) 122 and the one or more networks 125 as shown in FIG. 1. The front-end computing device 200 includes one or more processors 205 and one or more tangible, non-transitory memories 208 storing thereon various programs, applications, instructions, routines and data 210-220 which may be utilized in generating an irrevocable or guaranteed out-of-pocket cost of a prescription for a medication prescribed to a patient. Generally speaking, the local programs, applications, instructions, routines and data 210-215 may operate in conjunction with one or more back-end components 120 to perform various tasks relating to generating irrevocable or guaranteed out-of-pocket costs of prescriptions for medications prescribed for patients, e.g., by executing at least a portion of embodiments of any of the methods described herein, such as the method 300 and/or the method 500. The front-end computing device 200 may additionally include other components, such as a display 222 and one or more other user interface devices 225 such as a touchscreen, keyboard, mouse, microphone, scanner, camera, and/or other optical, auditory, and/or physical user interface devices.

As shown in FIG. 2, the one or more memories 208 of the front-end computing device 200 may store an irrevocable OOP cost generating module or component 210 and/or one or more irrevocable OOP cost ML models 212. In embodiments, the irrevocable OOP cost generating module 210 is a respective instance 160 of the irrevocable out-of-pocket cost generating module 138 executing an enterprise local computing device 105. In embodiments, at least some of the one or more irrevocable OOP cost ML models 212 may be respective instances of at least some of the set of irrevocable OOP cost ML models 152 provided by the back-end components 120. For example, the instance 210 of the irrevocable OOP cost generating module and the respective instances 212 of at least some of the irrevocable OOP cost ML models may have been downloaded into the front-end device 200 from the back-end servers 128. It is noted that in some embodiments, one or more of the components 210, 212 may be omitted from the front-end computing device 200. In some embodiments, one or more other modules, components, programs, applications, etc. 215 (each of which comprises respective computer-executable instructions that are executable by the one or more processors 205) may be stored on the one or more memories 208. For example, in an embodiment in which the front-end computing device 200 is a PED 110 associated with the patient, the instructions 215 may include instructions for accessing the irrevocable OOP cost generator 138 executing at the back-end servers 128, as a web service or other type of remote service or application. Additionally or alternatively, the instructions 215 may include instructions for accessing one or more of the irrevocable OOP cost ML models 152 stored at in the data storage devices 150 of the back-end system 128. Of course, the instructions 215 may include other instructions, e.g., for executing an instance of the enterprise client application 145, for accessing the website 115 of the enterprise, for performing other enterprise-related actions, etc.

FIG. 3 depicts a flow chart of an example method 300 for generating an irrevocable out-of-pocket (OOP) cost of a prescription for a medication that has been prescribed for a patient. The method 300 may operate in conjunction with embodiments of at least a portion of the system 100 of FIG. 1 and any one or more components and/or devices related thereto (such as, for example, the network(s) 125, the PEDs 110, etc.), with embodiments of at least a portion of the front-end computing device 200 of FIG. 2, and/or with other systems, processors, databases and/or devices. In some arrangements, one or more of the back-end system components 120 and/or one or more components of the front-end system components 118 may execute an instance of the method 300, either individually or jointly. For example, the irrevocable OOP cost generator 138, 160, and/or 210 may execute an instance of the method 300 (e.g., individually or jointly with other applications of the system 100), or an instance 108 of the enterprise client application 145 downloaded to and executing at a PED 110 may access the irrevocable OOP cost generator 138 executing at the back-end servers 128 (e.g., as a service) to execute or perform an instance of the method 300. For ease of discussion, though, and not for limitation purposes, the method 300 is discussed with simultaneous reference to FIGS. 1-2. Further, the method 300 may include additional or alternate steps other than those described with respect to FIG. 3, in embodiments.

At a block 302, the method 300 may include receiving, at a computing system of an enterprise, a request for an out-of-pocket (OOP) cost of a prescription for a medication prescribed for a patient. The computing system at which the request is received may be a computing system of an enterprise, such as a pharmacy or other enterprise which is legally allowed to dispense prescription medications, e.g., the enterprise computing system 100 of FIG. 1. In an embodiment, the request may be received via a user interface of a component of the system 100, such as the back-end servers 128, an instance 108 of the enterprise client application 145 executing on a PED 110 associated with the patient, an enterprise website accessed via an executing browser 115 executing on the PED 110 associated with the patient, etc. For example, the patient or enterprise personnel may enter the request via a user interface of a front-end computing device 105, 110 corresponding to the system 100. Additionally or alternatively, the request may be received via a network interface 130 of the back-end servers 128, such as when the request is electronically sent to the back-end servers 128 of the system 100, e.g., by one of the front-end components 118 or by some other computing device.

To illustrate using an example scenario, the patient may desire to first obtain an estimate of the out-of-pocket cost for the prescription prior to submitting the prescription to the enterprise for filling, e.g., so the patient may make an informed consumer decision. As such, the patient may request to obtain the OOP cost for the prescription from the enterprise. Indeed, in some scenarios, a patient may request to obtain OOP costs for multiple medications which may possibly fulfill the prescription (e.g., different brand name drugs, different available generics, different ingestion formats such as tablets, pills, liquids, etc., and the like) for consumer comparison or other purposes. The patient may directly make the request via an instance 108 of the enterprise client application 145 executing at the PED 110, via the enterprise website 112 accessed via a browser 115 executing at the PED 110, or via a user interface of a front-end enterprise computing device 105. Alternatively, an agent of the enterprise (such as a pharmacy technician or other enterprise personnel) may make the request of the OOP cost of the prescription on the patient's behalf, e.g., via a user interface of a front-end enterprise computing device 105.

At a block 305, the method 300 may include obtaining current information corresponding to the patient based on the received request. Current information corresponding to the patient may include the patient's name, address, and date of birth, for example. In some cases, the current patient information may also include one or more other types of demographic information of the patient, such as gender, race, ethnicity, marital status, level of education and/or student status, employment status, income, employer, type of employer, type of employment (e.g., full-time, part-time, seasonal), seasonality of employment (e.g., summer only, winter only, year-round), and/or other types of demographic information. In some scenarios, the current patient information may include information indicative of one or more insurance policies which cover prescription medications for the patient, such as a type of health insurance (e.g., HMO (Health Maintenance Organization), PPO (Preferred Provider Organization), Medicare or other type of governmental health insurance program, prescription-only insurance, etc.), a level of insurance coverage (and any associated terms, such as deductibles, co-pays, and the like), the identity of the insurance provider of the patient, and other information associated with the patient's prescription medication insurance coverage.

When the patient is a new customer or otherwise not known electronically to the enterprise system 100 (e.g., when no profile or account 155 of the patient is stored in the data store 150), obtaining 305 the current patient information may include obtaining at least some of the current patient information via the user interface of a PED 110 associated with the patient or via the user interface of a back-end server 128 or a front-end computing device 105 of the enterprise.

When the patient is an existing customer of the enterprise (or otherwise has an established relationship and history with the enterprise), obtaining 305 the current patient information may include accessing the patient profile or account 155 stored in the data store 150 of the system 100 to obtain information which is currently stored in the patient profile 155, which may include historical information indicative of patient characteristics and/or of previous patient activity related to filling prescriptions with the enterprise. For example, patient information which is currently stored in the patient profile 155 may include historical information related to patient characteristics such as historical address changes, changes in education level and/or student status, changes in marital status, changes in employment (e.g., changes in types of employment, employers, types of employers, etc.), changes in income level, etc., and corresponding dates on which the changes occurred. Patient information which is currently stored in the patient profile 155 may include historical information related to insurance policies which have covered prescription drugs for the patient, such as providers, types, policies, levels, etc., changes to the historical insurance information, and the dates/times of occurrences of the changes. Further, patient information which is currently stored in the patient profile 155 may include historical information corresponding to prescriptions which have been filled by the enterprise for the patient, including, for example, type and dosage of medication, prices of prescriptions, amounts covered by insurance, out-of-pocket amounts for which the patient was responsible, amounts which the patient paid towards the prescriptions and corresponding dates of payments, dates when the enterprise obtained prescriptions and initiated processing of the prescriptions, dates of prescription pick-ups and/or deliveries, etc. Of course, other types of information corresponding to the patient may be currently stored in the patient profile 155.

At a block 308, and prior to the enterprise computing system initiating any processing of the prescription for filling, the method 300 includes determining an irrevocable or guaranteed out-of-pocket cost of the prescription based on the current information corresponding to the patient, a given time interval set by the enterprise, and one or more constraints set by the enterprise for the given time interval. The determined, irrevocable OOP cost of the patient's prescription has a value in accordance with the one or more enterprise-set constraints for the given time interval. Generally speaking, the given time interval may start prior to or on the date of the execution of the present instance of the method 300, and may end at some point in the future after the execution of the present instance of the method 300 has been completed. The given time interval set by the enterprise may be any desired time interval, such as a month, a quarter, a year, two years, five years, etc. In an illustrative example, the enterprise sets the given time interval as a calendar year and the patient requests an irrevocable OOP cost for prescription on May 14 of that calendar year, thereby initiating an instance of the method 300.

The one or more constraints set by the enterprise for the given time interval may correspond to the set of prescriptions that are filled by the enterprise over the given time interval. For example, the one or more constraints set by the enterprise may include a maximum aggregate loss of the enterprise over the given time interval and/or a maximum aggregate profit of the enterprise corresponding to the set of prescriptions that are filled by the enterprise over the given time interval. The respective amounts of the maximum aggregate loss and/or the maximum aggregate profit may be fixed dollar amounts (or other types of currency amounts), e.g., a target maximum aggregate dollar loss amount and/or a target maximum aggregate dollar profit amount. Additionally or alternatively, the respective amounts of the maximum aggregate loss and/or the maximum aggregate profit may be determined based on the aggregate out-of-pocket costs of prescriptions filled by the enterprise during the given time interval, e.g., the total out-of-pocket costs of the prescriptions filled during the given time interval plus or minus some amount (e.g., plus or minus $1,000,000), plus or minus X % of the total out-of-pocket costs of the prescriptions filled during the given time interval, etc.

At any rate, the enterprise computing system determines 308 the value of the irrevocable OOP cost of the patient's prescription to be in accordance with the one or more enterprise-set constraints for the given time interval. That is, the value of the determined irrevocable OOP cost of the patient's prescription may, when aggregated with the OOP costs of the other prescriptions which have been (and will have been) filled by the enterprise over the given time interval, allow the enterprise to meet the one or more set constraints. In embodiments (not shown), the method 300 may include obtaining, by the computing system, the one or more constraints set by the enterprise for the given time interval, for example, via or from a user interface, database, or application at the back-end server 128, or from another computing device. In some scenarios, the enterprise may additionally or alternatively set narrower or more limited constraints for the given time interval, such as a maximum aggregate profit and/or maximum aggregate loss determined based on prescriptions filled, over the given time interval, for a particular patient group of a plurality of patient groups, where the plurality of patient groups may be delineated based on one or more criteria such as geographic location, demographic characteristic, type of insurance, etc. Of course, other limitations on or subsets of aggregate enterprise constraints may be set by the enterprise.

In some embodiments, at the block 308, the method 300 includes determining the irrevocable OOP cost of the prescription further based on one or more external conditions predicted to occur prior to the end or expiration of the given time interval. An "external condition," as utilized herein, generally refers to a condition which is initiated and/or caused by some party other than the enterprise and other than the patient or the patient's agent (e.g., an "external party"), where the condition affects out-of-pocket prescription medication costs. Examples of external conditions which may affect OOP costs of prescription medications may include, but are not limited to, a health care trend, expirations of various patents granted for various medications, the introduction of new medications, changes to terms of insurance policies, changes to types and/or levels of insurance which cover prescription medications, the introduction of new types and/or levels of insurance which cover prescription medications, an executive rule, law, and/or direction, a legislative rule, law, and/or direction, a judicial ruling, direction, and/or requirement, to name a few. In some implementations, the method 300 may include predicting, by the enterprise computing system, the respective occurrences of the one or more external conditions prior to the end of the given time interval, which is discussed in more detail elsewhere in this disclosure.

In some embodiments, at the block 308, the method 300 includes determining the irrevocable OOP cost of the prescription further based on one or more characteristics of the patient which are predicted to occur or change prior to the end or expiration of the given time interval. As previously discussed, such characteristics may include, for example, a change in a type of insurance (e.g., changing from private insurance to Medicare), a change in insurance terms (e.g., deductible amount, co-pay amount, etc.), a change in address or geographical location of the patient, a change in employment, a change in a life event (e.g., marriage, divorce, retirement, etc.), and the like. In some implementations, the method 300 may include predicting, by the enterprise computing system, the respective occurrences of the one or more patient characteristics and/or changes thereto prior to the end of the given time interval, which is discussed in more detail elsewhere in this disclosure.

At any rate, at the block 308, the method 300 may determine the irrevocable OOP cost of the prescription to have a value in accordance with the one or more constraints set by the enterprise for the given time interval. That is, the irrevocable OOP cost of the prescription for the medication prescribed for the patient is determined to be an amount such that an aggregation or sum of the OOP costs of prescriptions filled by the enterprise over the given time interval (which includes the subject prescription) satisfies the one or more constraints set by the enterprise.

At a block 310, and prior to the enterprise computing system receiving instructions from the patient to fill the prescription, and/or prior to the enterprise computing system initiating any processing of the prescription for filling, the method 300 may include presenting, by the computing system in response to the request, the irrevocable out-of-pocket cost of the prescription for the medication prescribed for the patient at one or more of: a user interface of the computing system or a user interface of a computing device corresponding to the patient. For example, the irrevocable OOP cost of the prescription may be presented at respective user interfaces of the enterprise back-end servers 128, the enterprise front-end computing devices 105, and/or the PEDs 110. In some implementations, the irrevocable OOP cost of the patient's prescription may be stored in the patient's profile 155.

At optional blocks 312 and 315, and subsequent to the execution of the block 310, the method 300 may include receiving 312, by the computing system, an indication of an instruction to fill the prescription for the medication prescribed for the patient and for which the OOP irrevocable cost was determined and, based on the instruction, initiating 315, by the computing system, the processing of the prescription for filling. The indication of the instruction to fill the prescription may be received 312, for example, via a user interface of a component of the system 100, such as the back-end servers 128, an instance 108 of the enterprise client application 145 executing on a PED 110 associated with the patient, an enterprise website accessed via an executing browser 115 executing on the PED 110 associated with the patient, etc.

Processing 315 of the prescription for filling may include, for example, storing initial information corresponding to the filling of the prescription (e.g., prescription information, date, location, determined irrevocable OOP cost, etc.) in the patient's profile 155, and informing pharmacy personnel that the prescription is ready to fill. Processing 315 the prescription for filling may also include submitting 315a information corresponding to the filling of the prescription to an insurance provider of the patient, e.g., by transmitting the information electronically via the network interfaces 130 or by some other suitable means. Additionally, and importantly, processing 315 the prescription for filling may include charging 315b the patient the irrevocable out-of-pocket cost of the prescription (e.g., upon pick-up or mailing of the prescription to the patient), where the irrevocable OOP cost of the prescription remains constant or the same as when the cost was determined 308 irrespective of any monetary amount provided by the insurance provider to cover the price of the prescription. For example, if the insurance provider covers an amount of the prescription price so that the balance due for the prescription is greater than the determined irrevocable OOP cost, nonetheless the enterprise charges 315b the patient the determined irrevocable OOP cost of the prescription. Likewise, if the insurance provider covers all of the prescription price, nonetheless the enterprise charges 315b the patient the determined irrevocable OOP cost of the prescription. Further, processing 315 the prescription for filling may include storing additional information corresponding to filing the prescription (e.g., insurance provider, amount covered by insurance, date of pick-up of the filled prescription, etc.) in the patient's profile 155.

Some embodiments of the methods, systems, and techniques described herein utilize one or more specially trained machine learning models to determine the irrevocable outof-pocket cost of patient prescriptions. For example, determining the irrevocable out-of-pocket cost of the patient prescription based on the current information corresponding to the patient, the given time interval set by the enterprise, and the one or more constraints set by the enterprise for the given time interval (e.g., in a manner such as discussed above) may include utilizing a set of irrevocable out-of-pocket machine learning (ML) models to determine the irrevocable OOP cost of the prescription. For instance, one or more of the irrevocable out-of-pocket cost ML models 152 may be applied to respective indications of the current information corresponding to the patient, the given time interval, and the one or more enterprise-set constraints for the given interval to thereby generate an output corresponding to and/or indicative of the irrevocable out-of-pocket cost of the patient's prescription which has the value in accordance with the one or more constraints.

To illustrate, FIG. 4 depicts a block diagram of an example implementation of one or more irrevocable out-of-pocket (OOP) cost machine-learning (ML) models 400, which may be utilized in conjunction with embodiments of the systems, methods, and techniques described herein. For example, the irrevocable OOP cost ML model(s) 400 may be included in the irrevocable OOP cost ML model(s) 152 of FIG. 1 and/or in the irrevocable OOP cost ML model(s) 212 of FIG. 2; the irrevocable OOP cost ML model(s) 400 may be utilized by the irrevocable OOP cost generator 138, 160 of FIG. 1 and/or by the irrevocable OOP cost generator 210 of FIG. 2; and/or the irrevocable OOP cost ML model(s) 400 may be utilized during execution of embodiments of the method 300 of FIG. 3 and/or the method 500 of FIG. 5. For ease of discussion, the irrevocable OOP ML models 400 are discussed with simultaneous reference to FIGS. 1-3. However, in some implementations, the ML models 400 may be utilized in conjunction with systems other than the system 100 of FIG. 1, with devices other than the front-end computing device 200 of FIG. 2, and/or with other methods other than the method 300 of FIG. 3.

Generally speaking, the one or more irrevocable OOP cost ML models 400 are particularly and specially trained to operate on inputs indicative of a prescription 402 for a medication which has been prescribed for a patient, current information 405 corresponding to the patient, a given time interval 408 set by the enterprise, and one or more constraints 410 set by the enterprise for the given time interval to generate an output 412 which may provide (or which may be utilized to provide) an irrevocable OOP cost of the prescription for the patient. The value of irrevocable OOP cost 412 of the patient's prescription generated by using the one or more irrevocable OOP cost ML models 400 is in accordance with the one or more constraints 410 set by the enterprise for the given time interval 408, e.g., so that when the irrevocable OOP cost of the patient's prescription is aggregated with other OOP costs of other prescriptions filled by the enterprise during the given time interval 408, the enterprise meets the one or more set constraints 410. In manners similar to that described elsewhere in this disclosure, the prescription information 402 may include, for example, the name of the medication, its dosage, and/or other information included in the prescription written by the prescribing clinician. Additionally, the current information 405 corresponding to the patient may include various current, patient-related information, such as the patient's current name, age, address, insurance policy (if any) and optionally one or more terms of the insurance policy, and/or other current patient characteristics. In some situations, the current patient information 405 may include at least some of the information which is currently stored in the patient's profile or account 155 with the enterprise (which, as previously discussed, may include records of historical pharmacy transactions between the patient and the enterprise, records of changes in characteristics of the patient, and the like). The given time interval 408 set by the enterprise may be a time interval during which the operation of the OOP cost ML model(s) 400 on the patient's prescription is initiated and completed (e.g., such as discussed above), and the one or more constraints 410 set by the enterprise for the given time interval 408 may correspond to aggregate information associated with the plurality of prescriptions which are filled by the enterprise during the given time interval 408 (e.g., maximum aggregate enterprise profit over the given time interval, maximum aggregate enterprise loss over the given time interval, and/or other constraints 410 set by the enterprise), in manners similar to those discussed elsewhere within this disclosure.

In some implementations, the one or more irrevocable OOP cost ML models 400 are also trained to operate on inputs which are indicative of one or more current external conditions 415. As previously discussed, external conditions may be conditions which are initiated and/or caused by some party other than the enterprise, the patient, and the patient's agent, where the external conditions affect out-of-pocket prescription costs (for example, healthcare trends, changes to insurance policies and products, legislative rulings, expiration of patents, etc.). As such, the set of current external conditions 415 whose indications are provided as input into the one or more irrevocable OOP cost ML models 400 may include a snapshot of one or more current external conditions at the time at which the one or more irrevocable OOP cost ML model(s) 440 are utilized to operate on inputs related to the patient's prescription 402.

The output 412 of the irrevocable OOP cost ML model(s) 400 may indicate the irrevocable OOP cost of the patient prescription. In an embodiment, the output 412 indicates one or more candidate irrevocable OOP costs of the patient prescription whose values allow the enterprise to meet the one or more constraints specified for the given time interval, and respective levels of confidence of each candidate irrevocable OOP cost. The irrevocable OOP cost generator 138, 160, 210 (or some other enterprise application 148) utilizing the model(s) 400 may select a candidate irrevocable OOP cost from the output 412 by the model(s) 400 to be the irrevocable OOP cost of the patient's prescription based on the respective levels of confidence. For instance, the irrevocable OOP cost generator 138, 160, 210 (or other enterprise application 148) may select a candidate irrevocable OOP cost having a highest level of confidence, having a level of confidence greater than a predetermined threshold, etc. In another embodiment, the irrevocable OOP cost ML model(s) 400 may itself determine the (single) irrevocable OOP cost of the patient's prescription and indicate said cost in the output 412.

In an embodiment, the one or more irrevocable OOP cost ML models 400 may include one or specially trained models 418, 420, whose outputs may be utilized by another specially trained model 422 to determine the output 412 indicative of the irrevocable OOP cost of the patient's prescription. For example, a condition-predicting ML model 418 may be trained to operate on one or more inputs indicative of current external conditions 415 and the given time interval 408 to predict respective occurrences of one or more external conditions affecting OOP prescription costs (which may be changed or new external conditions) during the remainder of the given time interval 408. Indications of the one or more external conditions predicted by the condition-predicting ML model 418 may be provided as inputs into another ML model 422 to thereby generate the output 412. Additionally or alternatively, a characteristic-predicting ML model 420 may be trained to operate on one or more inputs indicative of current patient characteristics or information 405 and the given time interval 408 to predict respective occurrences of one or more characteristics of the patient (which may be changed or new patient characteristics) during the remainder of the given time interval 408. Indications of the patient characteristics predicted by the characteristic-predicting ML model 420 may be provided as inputs into the ML model 422 to thereby generate the output 412.

Of course, other combinations of multiple ML models 400 which operate in conjunction to generate the output 412 indicative of the irrevocable OOP of the patient prescription may be possible. Alternately, in some implementations, the set of irrevocable OOP cost ML models 400 may include only a single ML model.

FIG. 5 depicts a flow chart of an example method 500 for creating or generating an irrevocable out-of-pocket (OOP) cost machine-learning model, such as one or more of the model(s) 152 of FIG. 1, the model(s) 215 of FIG. 2, and/or the model(s) 400 of FIG. 4. The method 500 may operate in conjunction with embodiments of at least portions of the system 100 of FIG. 1 and any one or more components related thereto (such as the personal electronic devices 110, the back-end servers 128, the network(s) 125, etc.), embodiments of at least portions of the front-end computing device 200 of FIG. 2, and/or other systems, processors, databases, and/or devices. For example, the model trainer 140 of the system 100 may perform at least a portion of the method 500. For ease of discussion herein, and not for limitation purposes, the method 500 is discussed with simultaneous reference to FIGS. 1-4. Additionally, in some embodiments, the method 500 may execute in conjunction with embodiments of the method 300 of FIG. 3. For example, the method 500 may execute prior to executing the method 300, e.g., to initially generate and train one or more of the irrevocable OOP ML models, and/or the method 500 may be executed after executing the method 300, e.g., to retrain or update one or more of the irrevocable OOP ML models. Further, the method 500 may include additional or alternate steps other than those described with respect to FIG. 5, in embodiments.

At a block 502, the method 500 includes obtaining historical data to utilize in training and/or-retraining one or more irrevocable out-of-pocket (OOP) cost machine learning models. The historical data may include data indicative of, for example, out-of-pocket costs of a plurality of prescriptions that have been filled for a plurality of patients and respective times or dates of occurrences of the out-of-pocket costs; respective enterprise conditions which have occurred during different time intervals and which are based on out-of-pocket costs of prescriptions which were filled during the different time intervals (e.g., respective aggregate profit of the enterprise, respective aggregate loss of the enterprise, respective aggregate profit of the enterprise attributed to a specific patient group, respective aggregate loss of the enterprise attributed to the specific patient group, and/or other enterprise conditions which have occurred during the different time intervals, etc.); respective changes over time to a plurality of characteristics (e.g., demographic information, patient preferences, insurance coverages, types of insurance, employment, education level, life events, and/or other types of patient characteristics, such as described above) of the plurality of patients and respective times or dates of respective occurrences of the respective changes to the plurality of patient characteristics; and/or a plurality of external conditions which have occurred and respective times or dates of occurrences of the plurality of external conditions, to name a few. For example, obtaining the historical data may include obtaining or accessing the historical data 158 stored in the enterprise data stores 150.

In some implementations, obtaining the historical data (block 502) may include obtaining a subset of an entirety of the stored historical data 128. For example, an entirety of the historical data 128 stored in the back-end data store 150 of the system 100 may be filtered based on a particular customer, a particular patient characteristic, a particular location within the enterprise, a particular type of insurance, a particular type of medication, and/or other criteria.

At a block 505, the method 500 includes training one or more irrevocable out-of-pocket (OOP) cost models (which may be implemented as one or more machine-learning models, for instance) based on the obtained historical data to determine out-of-pocket costs of different prescriptions corresponding to different sets of enterprise conditions over different time intervals. Generally speaking, at the block 505, one or more machine-learning techniques (e.g., classification, clustering, regression, density estimation, visualization, projection, deep learning, statistical inference, inductive learning, deductive inference, transductive learning, multi-task learning, online learning, transfer learning, ensemble learning, neural networks, supervised, unsupervised, semi-supervised, self-supervised, etc.) may be applied to the obtained historical data to determine out-of-pocket costs of prescriptions for different sets of enterprise conditions over different time intervals.

In an embodiment of the method 500, training 505 the one or more irrevocable OOP cost models may include training, by utilizing at least a portion of the historical data, at least one of the one or more irrevocable OOP cost models (e.g., the condition-predicting ML model 418) to predict respective occurrences of one or more external conditions during different time intervals given different sets of initial external conditions of the different time intervals. As such, when the irrevocable OOP cost ML model(s) 400 are utilize to generate or determine the irrevocable OOP cost 412 of the patient's prescription, an indication of the current external conditions 415 and an indication of the given time interval 408 may be input into the trained condition-predicting model 418 to thereby generate a set of external conditions that are predicted to occur (with a given level of confidence) during the given time interval. The predicted set of external conditions may be input, along with the patient prescription 402, the current patient information 405, and the enterprise-set constraints 410 into another ML model 422 included in the one or more irrevocable OOP cost ML models 400 to thereby generate the irrevocable OOP cost of the patient prescription 412.

In an embodiment of the method 500, training 505 the one or more irrevocable OOP cost models may include training, by utilizing at least a portion of the historical data, at least one of the one or more irrevocable OOP cost models (e.g., the characteristic-predicting ML model 420) to predict respective occurrences of changes to one or more characteristics of patients during different time intervals given different sets of initial patient characteristics of the different time intervals. As such, when the irrevocable OOP cost ML model(s) 400 are utilize to generate or determine the irrevocable OOP cost 412 of the patient's prescription, an indication of the current information corresponding to the patient 405 and an indication of the given time interval 408 may be input into the trained characteristic-predicting model 420 to thereby generate a set of changes in characteristics of the patient that are predicted to occur (with a given level of confidence) during the given time interval 408. The predicted set of patient characteristics may be input, along with the patient prescription 402, the current patient information 405, and the enterprise-set constraints 410 into another ML model 422 included in the one or more irrevocable OOP cost ML models 400 to thereby generate the irrevocable OOP cost 412 of the patient prescription.

Of course, in embodiments in which the condition-predicting model 418 and/or the characteristic-predicting model 420 are integral with the other ML model(s) 422, training 505 the one or more irrevocable OOP cost models 400 may include integrally training the one or more irrevocable OOP cost models 418, 420, 422 to predict, in addition to predicting or determining out-of-pocket costs of prescriptions for different sets of enterprise conditions over different time intervals, respective occurrences of one or more external conditions during different time intervals given different sets of initial external conditions of the different time intervals, and/or respective occurrences of changes to one or more characteristics of patients during different time intervals given different sets of initial patient characteristics of the different time intervals.

Creating and/or training the one or more irrevocable OOP cost ML models (block 505) may include utilizing supervised and/or unsupervised machine learning techniques. For example, to create an initial irrevocable OOP cost ML model, supervised machine learning techniques may be applied to a training data set that has been pre-populated with data corresponding to different patients respectively having different patient characteristics which change over time, different OOP costs for different prescriptions corresponding to the different patients and respective dates on which the different OOP costs were charged, different enterprise conditions occurring over different time intervals, different external conditions occurring at different times or dates, etc. Experimentation may be performed to determine strengths of association and/or correlation between various types of training data. For example, experimentation may determine respective strengths of association and/or correlation between initial external conditions and occurrences of subsequent, different external conditions over different intervals of time; initial patient characteristics and occurrences of subsequent, different patient characteristics over different intervals of time; OOP costs of various prescriptions of various medications and different external conditions, different patient characteristics, different prescriptions, and/or different enterprise conditions; etc.

The initially-generated one or more irrevocable OOP cost ML models may be subsequently trained (e.g., in a supervised and/or non-supervised manner) on additional data which has been logged or collected and is indicative of actual OOP costs which have been charged for actual patient prescriptions. For example, as the enterprise processes and fills prescriptions for various patients, data indicative of the processed and filled prescriptions, associated current patient characteristics, associated charged OOP costs, and optionally current external conditions and/or current enterprise conditions or constraints at the times and/or dates of the processing and filling of the prescriptions may be stored as additional historical data 128 to thereby update the historical data 128. The initially-generated irrevocable OOP cost ML model(s) may be re-trained on the updated historical data set 158 to generate one or more updated irrevocable OOP cost ML model(s). Thus, as the updated historical data set 158 includes data indicative of actual filled prescriptions and corresponding OOP costs, the updated one or more irrevocable OOP cost ML models may be trained to determine more optimized and/or more accurate strengths of association or correlation between various inputs 402, 405, 408, 410, 415, and/or to discover new associations and/or correlations between various inputs 402, 405, 408, 410, 415, thereby causing the one or more irrevocable OOP cost ML models to be able to generate more accurate outputs 412, and thereby resulting in more accurate estimated OOP costs which are able to meet enterprise-set constraints.

At a block 508, the method 500 includes storing the trained irrevocable OOP cost ML model(s) at one or more back-end computing devices of the enterprise. For example, the trained irrevocable OOP cost ML models 400, 418, 420, 422 may be stored within the back-end components 120 of the ML system 100, e.g., as model(s) 152 within data store 150.

At an optional block 510, the method 500 includes transmitting respective instances of the trained irrevocable OOP cost ML model(s) to one or more front-end computing devices and/or applications of the enterprise. For example, instances of the trained irrevocable OOP cost ML model(s) 152 may be transmitted (e.g., pushed and/or pulled) to each of a number of local computing devices 105, 200 for local storage and access, e.g., as model(s) 212. In some implementations, instances of the trained irrevocable OOP cost ML model(s) 152 may be transmitted (e.g., pushed and/or pulled) to each of a number of instances 108 of the enterprise application 145 for local access at user PEDs 110, e.g., as model(s) 212. For example, a specific front-end computing device 200 may store an instance 212 of the trained irrevocable OOP cost ML model 152, and various components or modules at the front-end computing device 200 (such as the irrevocable OOP cost generator 210) may access the instance 212 of the trained irrevocable OOP cost ML model 152 as needed.

In some arrangements, the block 510 may be omitted for one or more local computing devices 105, 200 and/or one or more instances 108 of the enterprise application 145. For example, rather than locally storing an instance 212 of the trained irrevocable OOP cost ML model 152, a front-end computing device 200 may remotely access the irrevocable OOP cost ML model 152 stored at the back-end components 120, e.g., via the network(s) 125 as/when needed. For example, the irrevocable OOP cost generator 210 at the front-end computing device 200 may remotely access the irrevocable OOP cost ML model 152 to determine an irrevocable OOP cost for a patient prescription, or other instructions 215 at the front-end computing device 200 may access or otherwise invoke the irrevocable OOP cost generator 138 at the back-end servers 128 to thereby access the irrevocable OOP cost ML model 152 to determine an irrevocable OOP cost for a patient prescription.

Thus, in view of the above, the novel methods, systems, and techniques described herein provide benefits and advantages that are not able to be provided by currently known techniques for estimating out-of-pocket prescription costs. For example, the novel methods, systems, and techniques described herein may provide an enterprise with a constrained, optimization framework which accurately estimates or generates irrevocable or guaranteed out-of-pocket prescription costs for given time intervals and given enterprise-set constraints which correspond to out-of-pocket prescription costs (such as aggregate maximum enterprise profit, aggregate maximum enterprise loss, etc.). As such, by utilizing the novel methods, systems, and techniques described herein, the enterprise may easily define and contain the bounds of the enterprise's aggregate exposure or position over time intervals as desired based on out-of-pocket prescription costs, e.g., for all patients serviced by the enterprise, for different groups or subsets of patients, etc. Furthermore, the systems, methods, and techniques described herein are able to guarantee the prescription costs which are quoted a priori for patients, thereby allowing patients to easily compare different options and make better informed consumer decisions prior to submitting prescriptions for filling, and thereby removing patient uncertainty and unexpected costs upon prescription pick-up and delivery. Importantly, enterprises may easily control constraints at an aggregate level across the enterprise and across various patient groups while providing guaranteed, assured out-of-pocket prescription cost estimates for patients.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

Further, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects or examples:

1. A method, comprising: receiving, at a computing system of an enterprise, a request for an out-of-pocket cost of a prescription for a medication prescribed for a patient, and based on the request, obtaining current information corresponding to the patient. The method further comprises, prior to initiating processing of the prescription for filling, determining, by the computing system, an irrevocable out-of-pocket cost of the prescription based on: the current information corresponding to the patient, one or more constraints set by the enterprise for a given time interval, changes to one or more characteristics of the patient predicted to occur prior to the end of the given time interval, and one or more external conditions predicted to occur prior to the end of the given time interval. The one or more external conditions may be conditions that affect out-of-pocket prescription costs, and the one or more external conditions may be initiated by one or more parties external to the enterprise, the one or more parties excluding the patient. The irrevocable out-of-pocket cost of the prescription may have a value in accordance with the one or more constraints set by the enterprise for the given time interval. Still further, the method comprises, prior to initiating the processing of the prescription for filling, presenting, by the computing system in response to the request, the irrevocable out-of-pocket cost of the prescription at one or more of: a user interface of the computing system or a user interface of a computing device corresponding to the patient.

2. The method of the preceding aspect, further comprising, subsequent to presenting the irrevocable out-of-pocket cost of the prescription: receiving, by the computing system, an indication of an instruction to fill the prescription; and based on the instruction, initiating, by the computing system, processing of the prescription for filling, the processing of the prescription for filling including: submitting information corresponding to the prescription and the patient to an insurance provider associated with the patient, and charging the patient the irrevocable out-of-pocket cost of the prescription irrespective of an amount provided by the insurance provider to cover a price of the prescription.

3. The method of any one of the preceding aspects, further comprising obtaining, by the computing system, the one or more constraints set by the enterprise for the given time interval, the one or more enterprise constraints including at least one of a maximum aggregate loss of the enterprise over the given time interval or a maximum aggregate profit of the enterprise over the given time interval, each of the maximum aggregate loss over the given time interval and the maximum aggregate profit over the given time interval respectively determined based on a plurality of prescriptions filled by the enterprise during the given time interval.

4. The method of any one of the preceding aspects, wherein determining the irrevocable out-of-pocket cost of the prescription for the patient includes applying a set of irrevocable pricing machine learning (ML) models to indications of the prescription for the patient, the current information corresponding to the patient, the one or more other characteristics of the patient predicted to occur prior to the end of the given time interval, the one or more external conditions predicted to occur prior to the end of the given time interval, and the one or more constraints set by the enterprise for the given time interval to determine the irrevocable out-of-pocket cost of the prescription for the patient, the set of one or more irrevocable out-of-pocket cost ML models trained on historical data to determine out-of-pocket costs of prescriptions corresponding to different sets of enterprise conditions over different time intervals, and the plurality of enterprise conditions corresponding to the one or more constraints.

5. The method of the preceding aspect, wherein the historical data utilized to train the set of one or more irrevocable out-of-pocket cost ML models includes the historical data indicative of: changes, over time, to a plurality of characteristics of a plurality of patients over time and dates of occurrences of the changes to the plurality of characteristics of the plurality of patients; out-of-pocket costs of a plurality of filled prescriptions filled for the plurality of patients and dates of occurrences of the out-of-pocket costs; a plurality of external conditions which have occurred and dates of occurrences of the plurality of external conditions; and a plurality of enterprise conditions which have occurred and dates of the occurrences of the plurality of enterprise conditions.

6. The method of the preceding aspect, wherein: the plurality of enterprise conditions which have occurred include at least one of: an aggregate loss of the enterprise or an aggregate profit of the enterprise; the at least one of the aggregate loss of the enterprise or the aggregate profit of the enterprise are based on prescriptions filled by the enterprise during a corresponding time interval; and the one or more constraints set by the enterprise over the given time interval include at least one of a maximum aggregate loss of the enterprise or a maximum aggregate profit of the enterprise over the given time interval.

7. The method of any one of the preceding aspects, further comprising predicting, by the computing system, the occurrences of the one or more external conditions; and wherein the one or more external conditions include one or more of: a healthcare trend, a new type of insurance corresponding to prescription medications; a change to a type of insurance corresponding to prescription medications; a change to a level of insurance coverage for prescription medications; respective expirations of one or more patents granted for prescription medications; an executive ruling and/or direction; a legislative ruling and/or direction; or a judicial ruling and/or direction.

8. The method of the preceding aspect, wherein: predicting the occurrences of the one or more external conditions includes applying a condition-predicting machine learning (ML) model to indications of a set of current external conditions and an indication of the given time interval; the set of current external conditions includes at least one of: a current healthcare trend, a current type of insurance for prescription medications, a current level of insurance coverage for prescription medications, current respective statuses of patents granted for medications, current executive rulings and/or directions, current legislative rulings and/or directions, or current judicial rulings and/or directions; and the condition-predicting ML model is trained on historical data indicative of a plurality of external conditions which have occurred and dates of occurrences of the plurality of external conditions to determine respective strengths of association between occurrences of different historical external conditions for different time intervals.

9. The method of any one of the preceding aspects, further comprising predicting, by the computing system and based on the current information corresponding to the patient, the occurrences of the changes to the one or more characteristics of the patient; and wherein the one or more characteristics of the patient include at least one of: an employer, a type of employer, a type of employment, a seasonality of employment, an education level, a student status, a marriage or partner status, an address, a type of insurance corresponding to prescription medications, or a level of insurance coverage corresponding to prescription medications.

10. The method of the preceding aspect, wherein: predicting the occurrences of the changes to the one or more characteristics of the patient includes applying a characteristic-predicting machine learning (ML) model to indications of the current information corresponding to the patient and an indication of the given time interval,
the current information corresponding to the patient is indicative of at least one of: a current employer, a current type of employer, a current type of employment, a seasonality of current employment, a current education level, a current student status, a current marriage or partner status, a current address, a current demographic, a current type of insurance corresponding to prescription medications, a current level of insurance coverage corresponding to prescription medications, or other information stored in a current account of the patient with the enterprise; and
the characteristic-predicting ML model is trained on historical data indicative of changes to a plurality of characteristics of a plurality of patients and dates of occurrences of the changes to the plurality of characteristics of the plurality of patients to determine respective strengths of association between occurrences of changes to different patient characteristics for different time intervals.

11. The method of the preceding aspect, wherein the patient is included in the plurality of patients, and the historical data indicative of the changes to the plurality of characteristics of the plurality of patients includes historical data indicative of a change to at least one characteristic of the patient.

12. A system of an enterprise, the system comprising: one or more data storage devices storing a set of irrevocable out-of-pocket (OOP) cost ML models trained on historical data to determine out-of-pocket costs of prescriptions for different sets of enterprise constraints over different time intervals; one or more communication interfaces via which the system receives a request for an out-of-pocket cost of a prescription for a medication prescribed for a patient; and
an irrevocable out-of-pocket cost generation component stored on the one or more data storage devices and configured to apply the set of irrevocable out-of-pocket cost ML models to indications of the prescription prescribed for the patient, current information corresponding to the patient, and one or more constraints set by the enterprise for a given time interval to determine an irrevocable out-of-pocket cost of the prescription for the patient, the irrevocable out-of-pocket cost having a value in accordance with the one or more constraints, and the irrevocable out-of-pocket cost of the prescription being a guaranteed out-of-pocket cost of the prescription determined prior to initiating processing of the prescription for filling.

13. The system of the preceding aspect, wherein the system is configured to provide the irrevocable out-of-pocket cost of the prescription to one or more of: a user interface of the system or a user interface of a computing device corresponding to the patient both (i) prior to the initiating of the processing of the prescription for filling of the filling of the prescription, and (ii) as a charge for the filling of the prescription.

14. The system of any one of aspects 12-13, further comprising a set of back-end servers, the set of back-end servers including at least some of the one or more data storage devices, the at least some of the one or more data storage devices storing the historical data and a model training component configured to train the set of irrevocable out-of-pocket cost ML models by utilizing the historical data and one or more of a supervised machine learning technique or an unsupervised machine learning technique.

15. The system of the preceding aspect, wherein:
the patient is a first patient, the prescription is a first prescription, and the medication is a first medication;
the set of back-end servers is configured to update the historical data to include data indicative of the current information corresponding to the patient, the one or more constraints set by the enterprise for the given time interval, and the determined irrevocable out-of-pocket cost of the prescription for the patient;
the model training component is configured to retrain one or more irrevocable out-of-pocket cost ML models included in the set of irrevocable out-of-pocket cost ML models by utilizing the updated historical data; and
the irrevocable out-of-pocket cost generation component is configured to apply the retrained one or more irrevocable out-of-pocket cost ML models to at least one of:

indications of a second prescription for a second medication prescribed for the first patient and updated current information corresponding to the first patient to determine an irrevocable out-of-pocket cost of the second prescription for the first patient; or indications of a third prescription for a third medication prescribed for a second patient and current information corresponding to the second patient to determine an irrevocable out-of-pocket cost of the third prescription for the second patient.

16. The system of any one of aspects of 12-15, wherein the historical data utilized to train the set of irrevocable out-of-pocket cost ML models includes the historical data indicative of: changes, over time, to a plurality of characteristics of a plurality of patients and dates of occurrences of the changes to the plurality of characteristics of the plurality of patients; out-of-pocket costs of a plurality of prescriptions filled for the plurality of patients and dates of occurrences of the out-of-pocket costs; and a plurality of enterprise conditions which have occurred and dates of the occurrences of the plurality of enterprise conditions.

17. The system of the preceding aspect, wherein: the plurality of enterprise conditions which have occurred include at least one of an aggregate loss of the enterprise or an aggregate profit of the enterprise; the at least one of the aggregate loss of the enterprise or the aggregate profit of the enterprise are based on prescriptions filled by the enterprise during a corresponding time interval; and the one or more constraints set by the enterprise over the given time interval include at least one of a maximum aggregate loss of the enterprise or a maximum aggregate profit of the enterprise over the given time interval.

18. The system of any one of aspects 16-17, wherein: the plurality of enterprise conditions which have occurred includes at least one of: an aggregate loss for a particular patient group of a plurality of patient groups, or an aggregate profit for the particular patient group;
the at least one of the maximum aggregate loss for the particular patient group or the maximum aggregate profit for the particular patient group are based on prescriptions filled by the enterprise for the particular patient group during a corresponding time interval; and
the one or more constraints set by the enterprise over the given time interval include at least one of a maximum aggregate loss of the enterprise attributed to the particular patient group or a maximum aggregate profit of the enterprise attributed to the particular patient group over the given time interval.

19. The system of any one of aspects 12-18, wherein:
the historical data further includes historical data indicative of a plurality of external conditions which have occurred and dates of occurrences of the plurality of external conditions, the plurality of external conditions being conditions that affect out-of-pocket prescription costs and that are initiated by one or more parties external to the enterprise, the one or more parties excluding the patient;
the plurality of external conditions indicated by the historical data includes one or more of: a healthcare trend, a new type of insurance corresponding to prescription medications; a change to a type of insurance corresponding to prescription medications; a change to a level of insurance coverage for prescription medications; respective expirations of one or more patents granted for prescription medications; an executive ruling and/or direction; a legislative ruling and/or direction; or a judicial ruling and/or direction;

the set of irrevocable out-of-pocket cost ML models is trained based on the historical data to predict different occurrences of one or more external conditions over the different time intervals; and
the irrevocable out-of-pocket cost generation component is configured to apply the set of irrevocable out-of-pocket cost ML models to an indication of one or more current external conditions in conjunction with applying the set of irrevocable out-of-pocket cost ML models to the indications of the prescription for the patient, the current information corresponding to the patient, and the one or more constraints set by the enterprise for the given time interval to thereby determine the irrevocable out-of-pocket cost of the prescription for the patient based on one or more external conditions that are predicted, via the set of irrevocable out-of-pocket cost ML models, to occur during the given time interval.

20. The system of any one of aspects 12-19, wherein:
the historical data further includes historical data indicative of historical changes, over time, to a plurality of characteristics of a plurality of patients and dates of occurrences of the historical changes to the plurality of characteristics of the plurality of patients;
the plurality of characteristics of the plurality of patients indicated by the historical data includes one or more of: an employer, a type of employer, a type of employment, a seasonality of employment, an education level, a student status, a marriage or partner status, another type of life event transition, an age, an address, another type of demographic information, a type of insurance corresponding to prescription medications, or a level of insurance coverage corresponding to prescription medications;
the set of irrevocable out-of-pocket cost ML models is trained based on the historical data to predict respective strengths of association between different patient characteristics and OOP costs of prescriptions over the different time intervals; and
the irrevocable out-of-pocket cost generation component is configured to apply the set of irrevocable out-of-pocket cost ML models to the indications of the prescription of the patient, the current information corresponding to the patient, and the one or more constraints set by the enterprise for the given time interval to determine the irrevocable out-of-pocket cost of the prescription for the patient based on one or more characteristics of the patient that are predicted, via the set of irrevocable out-of-pocket cost ML models, to occur during the given time interval.

21. Any one of the preceding aspects in combination with any other one of the preceding aspects.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A computer-implemented method, comprising:
receiving, at one or more computing devices of an enterprise and via a user interface of an electronic device corresponding to a patient, an indication of a medication prescribed for the patient;
predicting, by the one or more computing devices using a trained out-of-pocket cost machine learning model that is trained on historical data stored in one or more data stores of the enterprise, a set of identifications of one or more external conditions affecting out-of-pocket prescription medication costs that are anticipated to occur before a prescription of the medication is filled;

determining, by the one or more computing devices based on (i) the one or more external conditions affecting out-of-pocket prescription medication costs, including at least one regulatory, market or aggregate-enterprise condition beyond coverage-based discounts or coupon programs, (ii) a result of the trained out-of-pocket cost machine learning model, and (iii) one or more constraints set by the enterprise corresponding to an aggregate set of prescriptions that are filled by the enterprise over a given time interval, and irrespective of any monetary amount provided by an insurance provider, an indication of an out-of-pocket cost for a prescription of the medication prescribed for the patient;

causing, at the user interface of the electronic device corresponding to the patient, an indication of the out-of-pocket cost for the prescription to be presented;

receiving, by the one or more computing devices, an instruction from the patient to fill the prescription;

charging, by the one or more computing devices, the patient the determined out-of-pocket cost for the prescription when the filled prescription is picked up or delivered to the patient;

filling, by the one or more computing devices, the prescription in accordance with the out-of-pocket cost for the prescription generated by the trained out-of-pocket cost model; and storing, by the one or more computing devices, an indication of the determined out-of-pocket cost in a data store of the enterprise so as to render the determined out-of-pocket cost irrevocable with respect to subsequent changes in a coverage term, wherein the storing includes updating at least one irrevocable out-of-pocket cost record in a manner that maintains consistency with historical data of the one or more external conditions in the data store.

2. The computer-implemented method of claim 1, wherein the out-of-pocket cost indicated at the user interface is selected from a plurality of candidate out-of-pocket costs.

3. The computer-implemented method of claim 2, further comprising determining, by the one or more computing devices, the plurality of candidate out-of-pocket costs based on at least one external condition.

4. The computer-implemented method of claim 1, further comprising initiating, by the one or more computing devices, the filling of the prescription of the medication prescribed for the patient.

5. The computer-implemented method of claim 1, further comprising charging, to the patient, the out-of-pocket cost for the filled prescription.

6. The computer-implemented method of claim 1, wherein the plurality of one or more external conditions expires within the given time interval or another time interval.

7. The computer-implemented method of claim 1, wherein the one or more external conditions is initiated by one or more respective parties, the one or more respective parties excluding an enterprise with which the one or more computing devices are associated and the one or more respective parties excluding the patient or an agent of the patient.

8. The computer-implemented method of claim 7, wherein the one or more respective parties exclude any insurance providers.

9. The computer-implemented method of claim 1, further comprising determining or predicting at least some of the one or more external conditions.

10. The computer-implemented method of claim 1, wherein the given time interval corresponding to the one or more constraints set by the enterprise ends at a point in time after the prescription has been filled for the patient.

11. The computer-implemented method of claim 1, wherein the presenting of the indication of the out-of-pocket cost for the prescription at the user interface of the electronic device corresponding to the patient occurs prior to a completion of the filling of the prescription.

12. A computing system of an enterprise, comprising:
one or more processors;
one or more tangible, non-transitory memories; and
computer-executable instructions that are stored on the one or more tangible, non-transitory memories and that, when executed by the one or more processors, cause the system to:
receive, via a user interface of an electronic device corresponding to a patient, an indication of a medication prescribed for the patient;
predict, by the one or more processors using a trained out-of-pocket cost machine learning model that is trained on historical data stored in one or more data stores of the enterprise, a set of identifications of one or more external conditions affecting out-of-pocket prescription medication costs that are anticipated to occur before a prescription of the medication is filled;
determine, based on (i) the one or more external conditions affecting out-of-pocket prescription medication costs, including at least one regulatory, market or aggregate-enterprise condition beyond coverage-based discounts or coupon programs, (ii) a result of the trained out-of-pocket cost machine learning model, and (iii) one or more constraints set by the enterprise corresponding to an aggregate set of prescriptions that are filled by the enterprise over a given time interval, and irrespective of any monetary amount provided by an insurance provider, an indication of an out-of-pocket cost for a prescription of the medication prescribed for the patient;
cause, at the user interface of the electronic device corresponding to the patient, an indication of the out-of-pocket cost for the prescription to be presented;
receive, by the one or more processors, an instruction from the patient to fill the prescription;
charge, by the one or more processors, the patient the determined out-of-pocket cost for the prescription when the filled prescription is picked up or delivered to the patient;
fill, by the one or more processors, the prescription in accordance with the out-of-pocket cost for the prescription generated by the trained out-of-pocket cost model; and
store, by the one or more processors, an indication of the determined out-of-pocket cost in a data store of the enterprise so as to render the determined out-of-pocket cost irrevocable with respect to subsequent changes in a coverage term,
wherein a storing of the indication includes updating at least one irrevocable out-of-pocket cost record in a manner that maintains consistency with historical data of the one or more external conditions in the data store.

13. The computing system of claim 12, wherein the out-of-pocket cost indicated at the user interface is selected from a plurality of candidate out-of-pocket costs.

14. The computing system of claim 13, wherein the computer-executable instructions are further executable to determine the plurality of candidate out-of-pocket costs based on at least one external condition.

15. The computing system of claim 12, wherein the computer-executable instructions are further executable to initiate the filling of the prescription of the medication prescribed for the patient.

16. The computing system of claim 12, wherein the patient is charged the out-of-pocket cost for the filled prescription.

17. The computing system of claim 12, wherein the of one or more external conditions expires within the given time interval or another time interval.

18. The computing system of claim 12, wherein the of one or more external conditions is initiated by one or more respective parties, the one or more respective parties exclude an enterprise with which the system is associated, and the one or more respective parties exclude the patient or an agent of the patient.

19. The computing system of claim 18, wherein the one or more respective parties exclude any insurance providers.

20. The computing system of claim 12, wherein the computer-executable instructions are further executable to determine or predict at least some of the one or more external conditions.

21. The computing system of claim 12, wherein the electronic device corresponding to the patient executes a client application in communicative connection with the computer-executable instructions.

22. The computing system of claim 21, wherein the computer-executable instructions are further executable to provide respective instances of the client application to a plurality of electronic devices, the plurality of electronic devices including the electronic device corresponding to the patient.

23. The computing system of claim 12, wherein the given time interval corresponding to the one or more constraints set by the enterprise ends at a point in time after the prescription has been filled for the patient.

24. The computer-implemented method of claim 10, wherein the given time interval is a month, a quarter of a year, the year, or multiple years.

25. The computing system of claim 23, wherein the given time interval is a month, a quarter of a year, the year, or multiple years.

* * * * *